United States Patent
Mohsenzadeh

(10) Patent No.: US 9,767,455 B1
(45) Date of Patent: *Sep. 19, 2017

(54) SECURE AUTHENTICATION AND PAYMENT SYSTEM

(71) Applicant: Hossein Mohsenzadeh, Medford, MA (US)

(72) Inventor: Hossein Mohsenzadeh, Medford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/689,308

(22) Filed: Nov. 29, 2012

Related U.S. Application Data

(60) Division of application No. 10/375,501, filed on Feb. 26, 2003, now Pat. No. 8,346,659, which is a continuation-in-part of application No. 09/899,905, filed on Jul. 6, 2001, now Pat. No. 7,742,984.

(51) Int. Cl.
*G06Q 40/00* (2012.01)
*G06Q 20/38* (2012.01)

(52) U.S. Cl.
CPC .............................. *G06Q 20/3821* (2013.01)

(58) Field of Classification Search
CPC ....... G06Q 40/00; G06Q 20/10; G06Q 20/102
USPC .............................................. 705/35, 39, 40
See application file for complete search history.

(56) References Cited

U.S. PATENT DOCUMENTS

| | | | | |
|---|---|---|---|---|
| 6,029,151 | A * | 2/2000 | Nikander | 705/39 |
| 7,089,208 | B1 * | 8/2006 | Levchin et al. | 705/39 |
| 8,650,126 | B2 * | 2/2014 | Kwan | G06Q 20/04 |
| | | | | 705/14.1 |
| 2002/0029193 | A1 * | 3/2002 | Ranjan et al. | 705/39 |

* cited by examiner

*Primary Examiner* — Lalita M Hamilton
(74) *Attorney, Agent, or Firm* — Parker Ibrahim & Berg LLC; Stephen D. LeBarron

(57) ABSTRACT

A transaction and payment and processing system securely conducts transactions over the public telephone network. The transactions may be between and among entities of any type such as individuals, merchants, utilities, banks, etc. Nothing more than access to a telephone is required after initial registration of a user.

5 Claims, 7 Drawing Sheets

| | |
|---|---|
| 10 | User Account Number |
| 12 | Name |
| 14 | Address |
| 16 | Telephone Number |
| 18 | Social Security Number |
| 20 | Personal Identification Number |
| 22a | Identifier1 |
| 22b | Identifier2 |
| 24 | Funding Mechanism1 |
| 26 | Funding Mechanism2 |
| 28 | Transaction History |
| 30 | Account Balance |
| 32 | Currency |
| 34 | Voice Print1 |
| 36 | Voice Print2 |

Fig. 4

SECURE AUTHENTICATION AND PAYMENT SYSTEM

CROSS-REFERENCE TO RELATED APPLICATIONS

The present application is a divisional patent application and claims priority under the laws and rules of the United States, including 35 USC §120, to U.S. patent application Ser. No. 10/375,501 filed on Feb. 26, 2003 which is a continuation-in-part patent application of U.S. patent application Ser. No. 09/899,905 filed on Jul. 6, 2001 now U.S. Pat. No. 7,742,984. The contents of U.S. patent application Ser. No. 10/375,501 and U.S. patent application Ser. No. 09/899,905 as well as U.S. Pat. No. 7,742,984 are herein incorporated by reference in their entireties.

BACKGROUND OF THE INVENTION

Field of the Invention

The invention relates to authentication and payment systems and, more particularly, to secure authentication and payment systems.

Background Information

Authentication is a major constituent of essentially all commercial transactions. When individuals deal with each other face to face, authentication may be implicit if the individuals know each other. If they do not, authentication at various levels may be required before the transaction is allowed to be completed. For example, a photo ID such as a driver's license may be required by a party to the transaction before the transaction is allowed to proceed. Authentication is particularly a problem if the parties do not know each other and/or are not dealing with each other face to face. In such a case, various forms of identification, such as passwords, may be required as a condition of completion.

Authentication systems, of course, are adjuncts to payment systems. There are many systems used for exchange of value (payment) which include, but are not limited to, cash, checks and credit/debit cards. The latter are particularly vulnerable to fraud and theft, and account for substantial losses to merchants and financial institutions every year, despite significant efforts to authenticate the transaction of which they are a part.

Businesses which sell items of comparatively low cost have an especial need for transaction authentication which is simple and minimally intrusive but nonetheless robust. Purchasers of such items are largely members of the general public, often with limited patience. While they will accept some level of authentication in connection with a transaction, the level is generally not sufficient to ensure reliable authentication of all transactions, and customers will often refuse to deal with merchants who seek to impose higher levels of authentication. Thus, merchants frequently limit the authentication requirements that they impose, and therefore knowingly incur a predictable level of loss rather than lose customers who will not accept higher levels of authentication.

The cost of authenticating a transaction is also a major factor in its use. The cost of authentication must not be significant in relation to the cost of the article, else authentication may be omitted in order to induce the sale.

One of the first and still most widely used systems of authentication is the bank Automated Teller Machine (ATM) system that is used by many banks. In this system a financial institution issues to an individual an ATM card which is preprogrammed by the financial institution to be accepted by the network. The individual can then access funds and banking information by inserting or swiping the card using ATM specific apparatus which is connected to the network, either in real-time or through a dial-up service. The apparatus requests a PIN (personal identification number) from the user. After the individual has keyed in the PIN, the network matches the keyed PIN with a pre-recorded PIN. If the information matches exactly, the ATM network allows the individual to check his account balance, pay a bill, or receive currency from the machine, among other available transactions.

This level of authentication has been deemed acceptable to individuals and financial institutions, but it requires special apparatus (the ATM machines and the ATM cards) as well as a private communications network over which the transactions take place. Further, different banking networks belong to different ATM networks.

Authentication When Not Present (AWNP) has become an important issue in increasingly complex commercial transactions. Typically enterprises such as American Express®, VISA®, MasterCard®, banks or check-clearing networks and their affiliates (referred to collectively herein as Payment Networks (PN)) provide a unique apparatus to merchants that are connected to one or more PN's. In order to obtain authorization for a payment, the PN typically requires that the cards issued by them be swiped through the apparatus or that check numbers and other details be inputted on a keyboard by the merchant or by their agent. The merchant may also simply read the card or check data over the phone to the PN agent. The unique data is then transported on a network and authorization is obtained from the appropriate PN. The merchant then typically requires the customer to sign a template document to verify the purchase and the customer's responsibility for paying for the goods to the PN or, in the case of checks, to completing a check and signing it.

Sometimes a merchant will require a separate identification (ID), but in most circumstances, especially in the case of a PN card, the only authentication typically required is the PN card itself. After the customer signs the template document, the merchant relegates the responsibility for payment to the PN, relying on the authorization obtained from the PN and the signed document they have obtained from the customer. If the customer disputes the transaction, the merchant presents the document as a means of verifying the purchase.

This system relies on two premises:
 1. That the customer will promptly report a lost or stolen card, so that a card presented by a customer to the merchant, if not previously reported lost or stolen, can be assumed to belong to the customer presenting it.
 2. That the signature on the back of the card matches the template document after authorization has been obtained by the merchant.

There are many ways that fraud can occur in this arrangement. Some examples include, e.g., a card that has been stolen but not reported as such; a card that has not been signed by its authorized owner but has been signed by an unauthorized user instead; and failure of the merchant to check a signature when a customer signs the template document, among others. In the case of taking orders over a phone or on the internet, a card is not present and no signature is obtained to verify the customer; therefore, in most circumstances, if a customer disputes a transaction, the PN holds the merchant responsible, as the merchant was willing to proceed with the transaction without obtaining a signature. This is referred to in the card industry as "charge back", and can account for 2 to 10% of the value of the goods sold by the merchant. Additionally, most PN's require a higher transaction fee for Transactions When Not Present (TWNP), or for merchant classes that have higher proportion of their sales as TWNP, and thus the merchant's transaction costs are increased.

SUMMARY OF THE INVENTION

Despite the widespread adoption of the internet and the significant commerce which already takes place over it, a substantial portion of the public still does not use the internet for commercial transactions. For some of these the non-use is attributable to unfamiliarity with, or access to, computers which can access the internet. For others, it is due to lack of trust in the security features of the system.

Whether or not they have access to, or are able to or do, trust and use the internet, most people have long been accustomed to using the telephone and to conducting business over it. Unlike the internet, in which data can easily be intercepted by skilled hackers, telephone transmissions are difficult to intercept without specialized equipment and often then only with considerable difficulty. The main reason is that, with the telephone, communication takes place securely between two nodes within a channel, in contrast to the internet or other general public networks where multiple nodes have access to the same communication, thus allowing interception and hacking. This is the case both with landline telephones, in which the information being transmitted travels to a local central office via a unique circuit which is difficult to "tap" unobtrusively, as well as with wireless communications which may be encoded.

Telephone numbers are universally assigned uniquely to customers by the telephone company, and thus can serve as a unique identifier for a customer. The International Telecommunication Union (ITU) and all the global telephone operating companies have agreed to assigned country codes. For example, 1 identifies the United States, Canada and parts of Caribbean; 49 identifies Germany; and so forth. Furthermore, the various authorities and telephone companies in each country have decided on area codes and numbers for cities, areas or regions, e.g. 617 for Boston and 212 for parts of Manhattan. Within these areas, an individual subscriber is assigned a unique number. This numbering system allows, e.g., an individual in South Africa to simply dial the country code of the United States, the assigned area code, and finally the user number to reach a desired person or entity. This numbering system provides unique routing information which has been used primarily by Telephone Operating Companies (Telcos) for finding a subscriber, opening a circuit, and completing a call. The present invention uses this unique telephone numbering system as a principal identifier in routing and completing financial transactions and other transfer of goods and services.

In recent years various Telcos have made this number accessible to the users of the telephone system by way of "Caller ID" offering. In this service, the telephone number of the calling party is sent to the called party, along with the dialing information, thereby identifying the calling party. If the called party subscribes to the "Caller ID" service, he/she is thus enabled to see or otherwise ascertain the telephone number of the calling party in connection with the call. This number has been available internally to Telcos since the advent of electromagnetic switches in the early $20^{th}$ century. It became more transparent through the advent of digital switching, especially the Class 5 switches in the early 1980's. The caller information was and is used for signaling, routing and billing by Telcos. Hereinafter we designate Caller ID (CID) and any other unique identifier of a Telco network subscriber such as Caller Line ID (CLID) or Automatic Number Identification (ANI) and the like simply as Caller ID.

Various further uses have been proposed and/or implemented for making use of this functionality for performing authentication functions in various contexts. For example, one of the telephone companies has proposed to use it for authenticating requests for call forwarding services. See U.S. Pat. No. 6,018,570, issued Jan. 25, 2000, for "Methods And apparatus For Regulating The Remote Ordering, Authorization, Access And Control Of Services And Service Features Associated With A Terminal". In that patent, the unauthorized ordering of call forwarding services for an unsuspecting customer, and its subsequent use to place long distance calls, is proposed to be defeated by checking the ID of the telephone from which the service is ordered and refusing to implement call forwarding on the targeted customer telephone unless the ID of the requesting telephone is the same as the ID of the customer telephone. Another proposes to use it over one network (e.g., the telephone network) to authenticate purchases over a second, separate network (e.g., the internet). See U.S. Pat. No. 6,088,683, issued Jul. 11, 2000 to Reza Jalili for "Secure Purchase Transaction Method Using Telephone Number". In that patent, a customer contacts a merchant over a first electronic network (e.g., the internet) which either the customer, or the merchant, or both may deem insecure, and places an order. In connection with the order, the customer identifies itself by supplying its telephone number and a registration number previously issued by a central registry. The registration number is obtained by either calling or writing the central registry in advance of any transaction. The merchant then generates an invoice that includes the customer identification information and transmits it to the central registry. In order to complete the transaction, the customer must then call the central registry and confirm the order. The central registry may verify the customer by any of various techniques, one of which optionally may include use of the customer's caller ID.

This proposal has a number of defects which limit its usefulness. First, the exclusive arena in which transaction occurs is the world wide web i.e. the internet. The telephone is used for authentication purposes only, and not as the initiator or medium of the transaction. Further, the transaction requires multiple sessions on the part of the user, allowing lapse of time which can diminish its value from both the customer's and merchant's point of view. Specifically, by separating in time the initial purchase decision and its final approval by the customer, a "second thought" on the part of the customer is more likely to occur, and thus reduce the number of transactions. Further, fraud can occur in the very registration process itself, since registration is to be accepted not only from the registrant's telephone, but also from alternate telephone numbers. Although various security checks are suggested in the latter case, use of caller ID is merely one option, leaving open the distinct possibility that information that was in fact stolen from another (e.g., a Social Security number) may form the basis of registration.

It has also been proposed to use a party's caller ID as an substitute for their credit card number: see U.S. Pat. No. 6,227,447, issued May 8, 2001, for "Cardless Payment System". In the system of that patent, a customer makes a purchase by providing his/her telephone number and a PIN to a merchant in place of the usual credit card number. The merchant then retrieves the credit card number from the credit card issuer using this information. The telephone number and PIN may be supplied in person to the merchant, in which case there is no further verification provided for, or it may be done over the phone, in which case the merchant may obtain the number from the call itself and may use this without asking the customer to repeat its input or may use it to verify the telephone number input by the customer. In either case, the transaction is ultimately dependent on the merchant's obtaining and using the credit card number to complete the transaction, and the customer's telephone number is simply a mechanism through which the credit card number is retrieved.

In contrast to the above, I have developed a secure system for transaction authorization and payment. The system requires the use of only a single session by a user desiring to initiate a transaction, and in most cases a single network, and is instantly accessible via a telephone network, mobile or landline device. This device need not necessarily be a telephone; it can be a Personal Digital Assistant or other device. The device, however, must be one having a preassigned unique number on a telephone network or on an IP telephony network through a pre assigned IP gateway. For ease of use hereinafter, I refer to such a device simply as a telephone, with the clear understanding that the term is intended to encompass not only voice-transmission and reception devices commonly understood by the term "telephone" (i.e., "conventional telephones"), but also personal digital assistants and other devices used for connecting to the telephone network and each having a unique number assigned to them. Of course, the device may share a given telephone number with other telephones of a user as is now commonly done with conventional telephones in the case of extension telephones. Similarly, for convenience of reference, I refer to the person using the device to pay bills, make purchases, transfer money or other assets, etc., as "the customer", whether an individual or an organization, and even though a particular transaction may not in fact involve the purchase or sale of goods or services. The authorization process of the present invention is rapid and largely transparent to the customer. It can be implemented with a single session between the customer and a third party such as a merchant, yet is sufficient to establish and complete a transaction, together with payment for it as appropriate.

In the present application, I supplement and extend the system described in the parent application Ser. No. 09/899,905.

Accordingly, it is an object of the invention to provide an improved authentication system for transactions between entities.

Another object of the invention is to provide an improved authentication system which facilitates consumer transactions.

Still another object of the invention is to provide an improved authentication system which is unobtrusive with respect to the user.

Yet another object of the invention is to provide an improved authentication and payment system.

Still a further object of this invention is to provide a simple yet relatively secure system for authenticating an individual or organization and allowing them to forward and/or swap funds, goods and services including, but not limited to, stocks, motor vehicle titles, or other assets or certificates representing value.

Still a further object of the invention is to provide an improved authentication and payment system which is reliable, yet unobtrusive.

Yet a further object of the invention is to provide an improved authentication and payment system which does not require the presence at a particular site of a customer using the system.

Still a further object of the invention is provide an improved system for authentication and/or payment which is geographically universal.

Still a further object of the invention is provide an improved system for authentication and/or payment which does not require special apparatus for its operation.

BRIEF DESCRIPTION OF DRAWINGS

The foregoing and other and further objects of the invention will be more readily understood on reference to the following detailed description of the invention, when taken in connection with the accompanying drawings, in which:

FIG. 4 illustrates some of the data that may be included in a user's trust account;

DETAILED DESCRIPTION OF THE INVENTION

Figure 1:
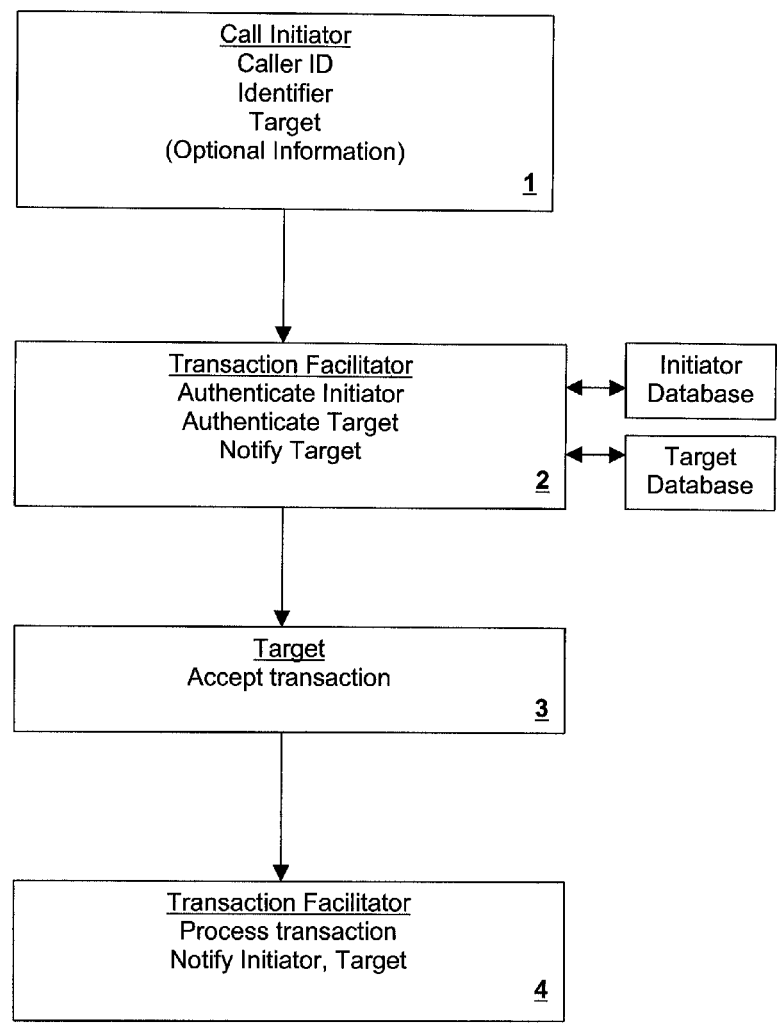
FIG. 1 is a block and line diagram of a first form of authentication and payment system.

In accordance with my invention, a customer (or, more generally a "source" or "initiator") conducts transactions securely by telephone with a "target". Such transactions may include, for example, the ordering of merchandise from a merchant (which term should be understood in the broadest sense herein to include any entity engaged in any form of business or commerce whatever); the payment of a bill to a merchant; the transfer of money to another person or merchant; the transfer of money from one account to another; or the transfer of assets or property from one entity to another, such as by transferring ownership of shares, etc., among other types of transactions. The transaction is performed either directly with the target or indirectly through an intermediary (hereinafter called for convenience "the Facilitator"). The Facilitator includes at least a data processor programmed to handle one or more portions of the transactions to be undertaken in connection with it. Typically, the Facilitator will include programs or program modules to receive a call over a telephone network; authenticate the call as described hereinafter; and process the transaction, such as by debiting and crediting various accounts or providing the required information for others to do so, or by keeping records of the transaction or otherwise enabling the transaction in an orderly manner. As necessary, one or more of these functions may in fact be performed by a human being.

The Facilitator typically maintains two separate databases, the first of which defines the customers, and the second of which defines at least some of the targets with which a customer may undertake a transaction. The customer database includes fields containing at least the customer's registered Telephone Number and a customer-selected password (PIN), as well as data pertaining to a Funding Mechanism (hereinafter, "FM", e.g., an account or line of credit with the Facilitator or with a third party, a bank account, a credit card, debit card etc.) against which transactions undertaken by the customer may be debited. Additional fields are preferably included, however, including the customer's name and default address and shipping preferences, such as shipping address, shipping mode (e.g., parcel post, United Parcel Service®, Federal Express®); additional FM's (e.g., one or more credit cards, with their requisite identifying numbers and other information; bank accounts, bank routing numbers; credit facility provider, amount of credit available etc.) and other data useful in processing transactions. Similarly, the target database contains fields including at least a target identifier (e.g., a sequence number assigned by the Facilitator, the telephone number of the target, or simply the name of the target) and a payment destination identifier that defines the entity into which authorized payments are to be made (e.g., an account with the Facilitator, an account with a bank, etc.).

Preceding completion of a transaction between two entities (which term is intended to encompass individuals as well), the Facilitator registers at least one of the parties to the transaction. Typically, this occurs before either entity uses the system, but may occur after only a single entity has registered. In the latter case, registration of the other party or parties to the transaction is preferably sought to be made part of the transaction, although completion of the transaction need not be conditioned on this. In order to register, a call is placed between the Facilitator and the entity to be registered, from which the primary identifier (i.e., the telephone number of the device to be registered to the entity) is obtained or verified. The entity then provides certain information such as a secondary identifier (e.g., password) to be associated with it and additional data such as its name, address, payment sources (in the case of a customer), destination account sources (in the case of a merchant or expected payee), or both (in case of those who will be both paying and receiving). Further data such as shipping preferences are desirably included. Where multiple alternatives are provided for a given data source (such as payment source, shipping mode, etc.), default preferences are established; these may simply be the first item listed in the respective categories. A key entry in each database is the Caller ID, which serves as the primary authenticator for the transaction, while a further preferably unique identifier such as a personal identification number (PIN) serves as the secondary authenticator for each transaction. A tertiary identifier may be provided for identification. The collection of data comprises a "voice wallet" which may thereafter be used to facilitate transactions. Some or all of this information may be obtained instead from the telephone company which stores certain data in connection with devices registered with it, or may be verified against the data maintained by the telephone company.

As a specific example of a typical expected registration procedure, assume that a customer wishes to conduct transactions with or through the Facilitator. The customer preferably first registers with the Facilitator. This may include the following steps 1. The customer calls the Facilitator from a given telephone or other device to be registered. Information pertaining to the telephone number of the device used by the customer is already on record at the Telco or other entity that maintains a telephone number and subscriber database, and in most circumstances has been verified by the Telco. This information includes the telephone subscriber's name, address (in case of land-line devices, the address where the telephone line is terminated), social security or other unique identification number, and credit check in most instances, among other information. The Telco database can also contain private unique information useful for identification, e.g., the mother's maiden name, etc. Information from additional sources such as credit card companies, credit bureaus, etc. may also be obtained and utilized by the Facilitator.

2. The Facilitator retrieves the requisite information from the Telco's database and, if private information is contained in the database, such as mother's maiden name, data and amount of the last telephone company bill or payment, outstanding balance on an account with another entity, etc. may require the customer to input that information for purposes of further verification. It might also simply send a sign-up form through the mail to the customer. The Facilitator may then store some or all of this information in its database.

3. The Facilitator then requires the customer to input FM information. For example, in the case of a bank account, the Facilitator may require bank routing information and an account number. Of course more than one FM can be mapped to a telephone number (account). Additional information may also be requested from the customer by the Facilitator.

4. The Facilitator then verifies that certain key information of the Telco or other third party database matches corresponding key information input by the customer, e.g., social security or other unique identification number, banking or credit line information, etc. If it does, the Facilitator then links the requested funding mechanism to the telephone number and requests a PIN number from the customer; the linking is typically performed simply by establishing an association in the database between the customer telephone and PIN numbers and the funding information for that customer. As part of the linking process, the Facilitator preferably checks certain information (e.g., Social Security number, mother's maiden name, etc.) provided by the registering party against corresponding data on record with respect to that party at the telephone company, as well data that may be on record with the funding mechanism entity. Of course, a PIN number may already have been supplied by the customer to the Telco when the customer signed up for an account with the Telco, and in that case need not be supplied again by the customer. Further, as an additional security measure, the Facilitator may require a written confirmation via mail or email before proceeding with linking the FM identifier to the telephone subscriber's line. The registration can be also performed via the internet or by mail or email in which case after the customer fills in the information and submits it, the Facilitator verifies it against the telephone company data for the device to be registered and then, if it matches, proceeds to link the customer telephone number and PIN to the collected data. The present invention is adapted to operate primarily in either of two modes. In a first, indirect, mode, the customer deals with the Facilitator only. For example if the customer wishes to engage in a transaction with a merchant target, the customer may initiate the transaction by calling the Facilitator on a telephone or other device which the customer has previously registered with the Facilitator and whose Identity (i.e. telephone number or other identity uniquely assigned by the telephone operating company or other authoriio ties) is thus stored in the Facilitator database. The Facilitator verifies the customer's identity at a first level of authentication by checking the Caller ID associated with the call against the information contained in the database. The customer next provides a password that is preferably unique to it; this may be done verbally, or by entry on a Touch-tone® telephone. The Facilitator then verifies the password. Of course, the Facilitator is may delay verification of the Caller ID until the password is received, and then verify both together. Next, the customer identifies the target and the transaction to be performed with it. For example, the customer might say: "Pay Sunshine Floral Shop of Boston $97.50 and charge my Empire Bank account number 837557". This information may, of course, alternatively be provided at the outset of the customer call, and held by the Facilitator pending customer verification. Additional data may, of course, be provided by the customer, and used in the transaction. For example, the customer may specify an item to be purchased, the quantity, shipping terms (e.g. United Parcel Service®, U.S. mail, etc.). The Facilitator confirms these requests against the target database and processes the transaction as described above. The key, however, is the telephone number of the customer, or the target, or both, which serves to uniquely identify one or both parties to the transaction.

The Facilitator responds by checking the account of the target, Sunshine Floral Shop of Boston. If no such account exists, the Facilitator may establish a default account to which the funds are temporarily credited. The default account is preferably simply defined by at least the target's telephone number. In connection with this, it preferably notifies the customer of this action. The Facilitator may also contact the target and offer it the opportunity to register an account with the Facilitator. If the target account already exists, the Facilitator verifies the data required to complete the transaction. If the registered data does not match the data given by the customer, the Facilitator notifies the customer, the target, or both, to resolve the issue. If the data does match, however, the Facilitator notifies the target of the desired transaction and requests approval by the target. This approval can be made during the call or at a time in the future. Any notification can consist of a telephone call, notification through a private network, an email, regular mail or any other means.

If qualified approval is obtained (e.g., the target approves of the transaction in general, but wishes to change the account into which the money is to be paid from its default account to some other account), the customer is notified and asked for approval if the requested change affects the stated terms of the transaction (e.g., the purchase price) but may not be notified if it does not (e.g., the destination of the payment when no destination is specifically designated by the customer) or if such transfers have been explicitly is or implicitly preapproved by the customer. Similarly, if the target has been provided in advance with a blanket approval of all transactions requested to be paid from customers, the approval is not necessary and a preset account is credited and the customer's account is debited. Once an account has been approved or approval dispensed with, the Facilitator debits the designated customer account, credits the designated target account, and preferably notifies both parties of the successful completion of the transaction. The customer may in fact approve of the modification of the transaction. For example, a parent who wishes to make a payment to a child for a designated purpose (e.g., payment of college tuition) may block payment of amounts it sends to a child to any account other than a designated tuition-payment account, e.g., an account of the college itself.

The target need not be a member of the Facilitator's network. As long as it is a subscriber to the Telco and has a unique telephone number, that number can be used for crediting and debiting funds or other assets. If the target's account is in credit, it can always forward funds to another telephone subscriber without explicitly registering with the Facilitator. If any funds or assets must be credited against an account with a FM i.e. a bank account etc., then registration is necessary.

The above transaction can be driven through an automated voice response system in a single step or in multiple steps to the extent necessary to accomplish the above task. In the above example, the transaction can be completed with a single phone call by the customer. In most instances, it is expected that the transaction will be completed without need for further input by the customer, and during the course of the call, which generally will be brief. Thus, a minimum of time is expected to elapse between the time the customer first initiates the transaction, and the time that the transaction is confirmed as complete. This minimizes the likelihood that a customer will change its mind during the transaction processing, an important consideration for merchants that deal in real-time purchases, such as goods that are advertised on the radio, on television, in print, and in other media.

A significant embodiment of the invention is the transfer of value or resources from one entity to another after authentication by using the unique Telephone Numbering system. For example, a customer who wishes, as a "transferor", to transfer money or some other resource, such as the title to a motor vehicle, or the ownership of a stock certificate to another ("the transferee") calls the Facilitator and identifies the transferee as the target of the transaction, such as by giving the transferee's telephone number; the amount of money to be transferred and the account against which the money is to be debited, in the case of a money transfer, or the data identifying the resource to be transferred and such other information as may be necessary or desirable for the transfer of the resource. The Facilitator then preferably checks the identity of the entity associated with the target's telephone number and reports this to the transferor for final approval, thereby providing an additional level of security to the transferor.

Once the transaction is approved within the transferor's account, a call or other form of notification is generated by the Facilitator to the transferee, in which the transferee is informed of funds or other resources which are available to him by transfer from the transferor. The transferee can then either register with the Facilitator (if not already registered) by providing his identity and other information, or may transfer the funds or resources to another target through the same procedure described above if this is permitted by the transferor or by the Facilitator. The transferee can be contacted by telephone, by email or by other means. As long as the target is uniquely identified through the phone numbering system, the transaction can be carried through. In all cases a pre-approved PIN may be used. Also, a request to pay another can be notified to the Facilitator by the customer by an email or a web page containing the telephone number of the target and all information required to complete the transaction. In this mode upon the receipt of the information the Facilitator generates a call and proceeds with completing the transaction. Finally, the customer can use the phone and request that a payment be made to a person where notification to the target is made through email or other modes like SMS messages on a mobile phone, or through checks to be issued etc.

Person-to-person (or entity-to-entity) transfers can securely be made in the course of a conversation between two parties in accordance with the present invention. For example if, during the course of a conversation, one party to the conversation decides to pay money or transfer an asset to the other, it can put the other party on hold (or initiate a three-way call), contact the Facilitator, and arrange for the transfer. The Facilitator can instantly authenticate the calling party through Caller ID and approve or complete the transaction as appropriate.

In situations in which the identity of the party initiating the call is authenticated by means other than by its telephone number, a party may initiate a transaction with another (the target) that is itself identified by a telephone number (Caller ID). In this mode, upon the receipt of the information, the Facilitator generates a call to the target and proceeds with the transaction. Alternatively, a party may initiate the transaction by calling the Facilitator using its telephone (so that its identity is established by its caller ID and password as described above) and initiate a transaction with another (the target) in a mode in which the target is communicated with other than through the telephone.

Rather than having the customer initiate the call, the system may also work in reverse, i.e., the customer may be the target of a call made by the Facilitator at the request of a merchant, a landlord, a utility, etc. For example, a cable television broadcaster may use the system to present its monthly bills to customers for payment over the telephone. The broadcaster may provide the Facilitator with a list of its customers and the payments due from each. The Facilitator then dials each customer. The details of the bill such as the name of the requesting entity (here, the broadcaster), the amount of the bill, and other data as desired are then presented to the customer and the customer is asked for its assent to payment. Verification is ensured by means of the customer's telephone number which the Facilitator itself has dialed and, optionally, the password or other unique information provided by the customer when the call is answered. On receiving the assent of the customer, the requester (broadcaster) is notified for its records, and the Facilitator may directly proceed to complete the transaction by debiting and crediting the appropriate accounts if the requester so desires. The customer can request that the call be made, for example, 5 days later, or 3 days before the bill is due, or at the due date, etc. The system records this request and initiates the call in accordance with the request. The requests can also be setup on the internet at the Facilitator's web site. The customer can also directly call the Facilitator and request that the bills be paid. In this mode, the Facilitator verifies the customer's Caller ID and password, if necessary and proceeds with crediting the biller's account and debiting the customer's account.

It is important to note that under most circumstances described in this application, the Facilitator can check the Telco directory (or other source, e.g., a channel partner, its own database, etc.) for a target's name or alias and report it to the subscriber. If the target's name is not listed in the directory then this can also be reported. In this way a validation occurs which builds confidence for the transaction.

In a second, direct, mode of operation of the invention, a customer contacts a target directly, instead of through the Facilitator. For example a customer desiring to purchase an item sold by a particular merchant calls the merchant on a registered telephone. Before placing the order, the customer may inquire as to features of the desired item, price, availability, warranty, etc; this information is provided by the merchant. If the customer desires to proceed with the transaction, the merchant transfers the call to the Facilitator for authentication of the customer. The Facilitator authenticates the customer by means of the customer's telephone number and may also verify that the customer has sufficient funds to pay for the transaction and may, if desired, debit the customer account and credit the merchant account. Following authentication, the Facilitator may transfer the call back to the merchant for completion of the transaction or may, if desired, complete the transaction itself, preferably with confirmation to both the customer and the merchant. Completion by the Facilitator may encompass only some aspects of the transaction, such as the financial aspects of debiting and crediting the customer's account and crediting the merchant's account, with the rest (e.g., shipping) being performed by the merchant, or may encompass all further aspects of the transaction in its entirety.

Bill presentation and payment by a requester may be performed in the direct mode as well. Thus, the requestor calls the customer itself or the customer calls the requester but, on obtaining the customer's assent to payment of the bill (e.g., by authorizing a charge to a credit card, debit card, or other FM's), the requester transfers the call to the Facilitator for at least authentication of the customer. The Facilitator may perform only the authentication portion of the transaction, or may additionally perform some or all of the completion of the transactions (e.g., the financial aspects, accounting, and the like).

In an alternative mode, the customer can be physically present at the target's (e.g., merchant's) site. In this mode the customer provides the merchant a unique identifier, preferably his phone number or an alias provided by the Facilitator. The merchant then enters this information into a specific apparatus which is connected to a private or public network, or through a phone call to the Facilitator. The Facilitator then calls the customer or owner of the account for verification. The call may be made to the registered device primarily associated with the customer, or to a device whose number is associated with the customer in the customer database. Typically, the call is made to a mobile device. The customer can then approve the transaction. The approval can also be given by a surrogate for the customer such as a parent or any third party that owns the account and that is called instead of the customer. In any event, the approving entity provides a PIN and may select what FM to use for this transaction, among other attributes. The transaction may be completed by the merchant or by the Facilitator. In either case, the customer's purchase can be cleared and paid for without proceeding through any checkout line. The products can be picked up on leaving the store or shipped subsequently. The information provided by the customer about its account number can be provided verbally or through a card issued by the Facilitator, where the merchant swipes the card on a specific apparatus or reads the information via a telephone to the Facilitator. It can also be provided through infrared communication or other means of local communication, wirelessly or through coupling of the device carried by the customer to the one provided to the merchant by the Facilitator or its agent. Both direct and indirect mode of transactions can occur with this third mode. In any event, verification of the transaction is performed by telephone call by the Facilitator to the registered telephone number of the customer or the customer's surrogate (e.g., parent).

The call may alternatively be made on an approved device by the customer to the Facilitator, avoiding need for a callback, since the call itself provides to the Facilitator the caller's ID; additional customer information such as a secondary ID (e.g., the customer's PIN associated with the given device) may also be obtained by the Facilitator in connection with the call. In connection with all types of transactions defined herein, the customer or target may be provided with an "alias" by the Facilitator. This alias may be used to identify the customer to the merchant as one registered with the Facilitator, without compromising the private secondary identifier (password) used by the customer to authenticate itself to the Facilitator. This may be important with certain customers that do not desire to reveal their phone number to targets for privacy or other reasons. The Facilitator can decide to provide an alias for the shipping address, for payment information, to mask the customer's information to the target for privacy, or for other purposes, if required.

Either the target or the customer or both are identified by a predefined series of numbers or words or other means of unique identification, preferably the telephone number. However, the target may have been assigned more than one account, which in turn means that when a target is specified as a recipient of funds by a customer, in addition to the identifier, a specific secondary identifier may also be presented for an accurate routing of information, including funds. This may apply to corporate entities where a corporate account is set-up with many subaccounts.

In certain circumstances, individuals have placed a bar on transmitting their Caller ID in connection with calls that they make. In such circumstances, the individual can often momentarily circumvent this by dialing an "opt-out" code such as *82 or the like. Further, in some circumstances, a unique number for a telephone is not identified (for example, an office which displays a single number for all the extensions of the company), or Caller ID is barred without the ability for an individual to "opt out". In such circumstances, a call-back service may be used for all scenarios herein described. The number can be registered via phone, internet, mail, e-mail, etc after an initial account is set up. Then, when a call is generated from phone on which Caller ID is blocked, a password or secondary check, if necessary, is made. If the system is satisfied, it calls back on the pre-specified number. It might then require a further password, such as a secondary password and other means of uniquely identifying an individual before proceeding with any mode of operation herein described.

It is possible to have more than one account registered to a single phone number; for example, a husband, wife and child each having their own account from the same number. This is similar to a primary card holder in the credit card business, where a primary holder has an account and his/her spouse or child can have an account within the same credit line. In this circumstance the primary user, that is, the person of record with the phone company, must first register, and then allow any secondary person to register an account from the same number. Each individual may be assigned a unique PIN number, or a common number may be used. Each subaccount holder will be treated as a separate entity with their own FM and personal information. In some circumstances they can share funding sources. In order to identify the sub account a number or letter may be assigned by the Facilitator, for example 617 555 1111A, B etc.

As noted above, in certain circumstances, for example, a parent-child relationship, the child may be set up with an account in which provision is made for a call back to a parent. When the child then uses the system, or indeed even uses a physical credit card for purchasing goods and services, before the purchase is authorized, the Facilitator requests parental consent/approval prior to authorizing the purchase. This relationship can be extended to manager-subordinate as well, when a purchase is done by a subordinate, but approval has to be carried through by the manager. Of course a full report of transaction and summaries will be available to the parent, manager or any subscriber as such.

An individual or entity can also have multiple accounts linked together so as to operate an integrated account. This can be accomplished initially by setting up the first number, e.g., a home number, and then requesting the set up of a second number (e.g., a mobile device), a third (e.g., an office, a second home etc) or more. Each number can share FM's or have a unique FM or set of FM's linked to them. The individual can also request a callback service for any of the accounts. In this way the individual's account has a central location and can be reached via multiple devices (phone numbers), and integrated reports can be presented to the individual.

It is also possible to operate the system in an IP telephony environment. IP telephony typically has a unique IP address or telephone gateway, but this can be intercepted. In certain circumstance IPs are not static. Also, in contrast with the telephone numbering system, where a central authority regulates phone number issuance and management, due to the inherent nature of the internet as an open environment, there is no central controller of IP addresses, and therefore it is prone to abuse, especially for financial transactions. In accordance with the present invention, the Facilitator may be used to provide a gateway where an unauthenticated call can be initiated by the customer to a preassigned static IP address at the Facilitator. The Facilitator, based on pre-specified guidelines (e.g., previously disclosed sender IP address, a digital signature, unique information e.g., password, mother's maiden name, etc.) can establish and authenticate the individual. In connection with the authentication, the Facilitator generates a call to a pre-assigned phone number of the customer on the public switched network; obtains a password from the customer; and then originates a call or a message to a target. At the point of authentication, when the Facilitator has the required information, e.g., the current Caller ID, etc., it approves the transaction.

The present invention also readily lends itself to the secure and rapid transfer of money, either to the customer himself/herself or to others, or the transfer of money from one account of the customer to another within the same bank or another bank, as long as the FM/accounts have been established and registered with the Facilitator.

Credit lines may be made available to a registered customer by a bank or by the Facilitator itself. Thus, when registering for service, the Facilitator itself, either directly or through a third party, e.g., a bank, may provide credit to the phone account. The customer may call on this line as desired. The credit facility functions identically to the funding mechanism of the account outlined above; functionally it acts as a FM. When undertaking a transaction the customer, rather than selecting a credit card or bank account, requests the use of the credit facility. Of course more than one credit facility can be established for a single account by various credit providers or by the same provider. The user can select the provider when engaging in a transaction, just as he selected the FM prior to completing the transaction.

It is possible that either the target or the customer fund the account or receive funds in cash form directly or indirectly through a third party member of the Facilitator's network.

In funding the account, the customers can

1. Go to a bank branch, a Facilitator network member store, a Facilitator itself, a network member ATM machine, or other agents, herein referred to as Network Members (NMs), pay cash, physically present a credit card to be debited, or present a check, among other acceptable payment instrument acceptable to the NM. The NM, after satisfying itself with respect to the availability of funds, will then directly, via a private or public network, provide a message to the Facilitator with the customer's account identifier, e.g., the phone number, which results in a credit to the account of the customer. The payment to the NM acts as another FM here. The NM may also simply provide the customer with a receipt containing a coded number, which can then be used by the customer in a manner similar to the funding card serial number described below.

2. Buy a pre-assigned funding card similar to the telephone cards in existence today. The funding card will have a serial number. Once registered as described previously, the customer can provide the funding card serial number to the Facilitator and receive a credit, based on the purchase price or a ratio of the purchase price, on the account which may then be used to do all the various different applications described herein, including sending funds to a target. In fact the funding card acts as another FM.

In case of payout of the funds in cash to the target or recipient, the target can receive funds if:

1. The customer has provided a specific address, for example a bank branch in Wichita, Kans. In this mode the intermediary (The specific bank branch, NM store or other NM's) will receive an instruction from the Facilitator with a recipient's details. The recipient is notified via a call, email, mail or other means. The recipient will then go to the bank branch, etc. and produce an ID or other means of authentication to receive the funds
2. A check can be mailed by the Facilitator based on the target's name and address as provided by the customer instruction. A one time or limited time use card can be issued to the target at the request of the customer. The target can use this card on NM ATM networks to receive funds in full or partially until the funds are exhausted. It is not necessary that the recipient have a telephone account or register with the Facilitator in this circumstance.
3. A permanent debit or ATM card can be issued to the recipient, which enables any customer to send funds to the target. It is not necessary that the recipient have a telephone account or register with the Facilitator in this circumstance.

It is possible for the present invention to be used for purchasing or transmitting funds via the internet or other networks. In this hybrid mode a call is made between a customer and the Facilitator and the customer is authenticated. The target of a transaction that is the subject of the call is identified by an email address or other preassigned electronic network address. The Facilitator emails the recipient and requests it to register with it or to establish an account, if an account has not previously been established. The procedure thereafter is identical to that described above. Similarly the customer can email funds or send funds through the internet or other networks after establishing and registering an account with the Facilitator that is linked to the customer's telephone number. The transfer can be accomplished by going to the Facilitator's web site and filling out details of the recipient, including the recipient's telephone number. After calling back the customer to authenticate the transaction, the Facilitator calls the recipient and the procedures described above used to complete the transaction.

It is possible to use the system for mass distribution of promotions or funds, like check runs and rebates, to designated targets. In this mode, a mass distribution list is set up by the Facilitator which rings the target's telephone numbers as provided by the merchant and informs them that they have funds in their telephone account. The targets can then perform all the functionalities described herein, including paying bills and paying other targets etc. Similarly in another mode, a customer can receive a specific serial number from a merchant, the number being associated with, for example, a rebate on a digital camera. The customer then calls a prespecified number at the Facilitator and after providing the serial number, may obtain transfer of the funds to his/her account immediately or, based on pre-specified arrangement, at some future date. It is also possible that some personal information is then provided to the merchant from the Facilitator's database containing consumer information.

It is also possible that calls could be generated by the Facilitator and products solicited to be sold on behalf of a merchant. If a customer responds to the promotion and agrees to purchase the goods, funds may be transferred from his/her account to the merchant and goods shipped accordingly.

Illustrative examples of the manner in which the various entities (customer/requester, merchant, target) may interact with the Facilitator are shown in the accompanying drawings. In particular, in FIG. 1, a flow diagram of a first embodiment of a transaction processing and payment system in accordance with the invention is shown. To begin the process, a call initiator (e.g., a registered customer such as a consumer who desires to make a purchase or to transfer money from one account to another) places a call to a transaction Facilitator (step 1) on a registered phone (i.e., one whose Caller ID is registered with the Facilitator). The latter is a service provider that facilitates transaction processing and payment for entities such as consumers and businesses by authenticating the transaction initiator, and desirably the target of the call as well. The target may be, for example, a merchant, a bank, an individual, or other entity. For purposes of following the description, it may be helpful to think of the initiator as a consumer who wishes to pay a bill to a utility, although it will be understood that this example is for the purpose of explanation only, and that the invention is not so limited.

The initiator provides to the Facilitator a password (e.g., a personal identification number or PIN), preferably unique to the initiator, that serves as a secondary level of authentication; the primary level of authentication is provided by the Caller ID which is associated with the telephone handset that the initiator is using to place the call. The handset is desirably a landline phone, for maximum security against illegal interception, but may comprise a wireless phone instead. Information such as a password, and possibly other information as well, is entered by the initiator by voice or by telephone keypad in the case of touch-tone telephones.

The initiator identifies the target of the transaction (e.g., a public utility to which the initiator wishes to make payment of a bill) by voicing or keypad-entering an identifier for the target. This may be the target's name or it may be a unique identifier provided to the initiator by the target or from another source such as a directory and from which the target's record in the database can be accessed, either based on the identifier alone or on the identifier supplemented by additional information from the initiator or from other sources. Preferably, however, the target is identified to the Facilitator by its telephone number. This enables easy location of the target in the event that it is not already a registrant in the target database.

The Facilitator authenticates the initiator (step 2) by examining the Caller ID associated with the call to determine if it is a registered initiator. This is accomplished by comparing the initiator Caller ID with the initiator Database 10. The Facilitator also verifies the Caller Identifier (e.g., PIN) in a similar manner. If these two match a specific registrant in the database, the initiator is authenticated as that registrant. If they do not, the transaction is aborted. Various other actions may then be taken, such as asking the initiator to repeat the Identifier; notifying the registrant by voice mail of one or more failed access attempts; notifying public authorities; etc.

If initiator authentication is established, the Facilitator then preferably authenticates the target. This is typically accomplished in a similar manner to that of initiator authentication, but using a separate database 12. Of course the initiator and target databases may be combined in one but, because the two will generally have different data fields, it will generally be more efficient to use separate databases for them.

On establishing initiator authentication, the target is notified of the initiator's desire to undertake a transaction with it. If the target is already registered with the Facilitator, the target is given the opportunity to refuse the transaction, in which case the initiator is notified and the transaction is terminated. Typically, however, the target will accept the transaction (step 3) by transmitting its assent to the Facilitator. In connection with acceptance, the target may specify the account into which any payment is to be made if this has not already been established by the user. Additionally, the target may supply other data to shape the transaction, if the user has not specified to the contrary.

If the target is not already registered with the Facilitator, the target is given the opportunity to do so. It may do so in a manner similar to that in which a Call initiator registers, i.e., by providing to the Facilitator data such as a preferably unique identifier; a Caller ID (this, in fact, is provided by the telephone service provider), and other data that may be appropriate in connection with the transactions to be undertaken with or by it. After registration, which may take place wholly over the telephone and during the same session as that in which the target is notified of a desired transaction with it, and after acceptance of the transaction, the transaction is processed (step 4). Typically, this involves debiting an account of the Call initiator and crediting the account of the target. Finally, the initiator and the target are notified of completion of the processing, and the transaction is thereby completed. Of course, if registration by the target is refused, the initiator is notified and the transaction is terminated without processing such as debiting or crediting of accounts.

This mode of operation is suitable for a number of the transactions described in detail above. For example, one person (e.g., a parent) wishing to send money to another (e.g., a child) may readily do so by means of a single telephone call to the Facilitator, specifying the telephone number of the child and the amount to be transferred. Specific conditions, e.g., the particular account into which the money is to be transferred, forbidding retransfer to other accounts etc., may also be specified by the parent as desired and as permitted by the Facilitator.

Another example of this mode of operation is in connection with shopping at a merchant's. A customer who is in a merchant's shop and desires to purchase goods or services may call the Facilitator and provide it with a telephone number that the merchant has designated for this purpose, as well as the amount to be paid and other appropriate data (e.g., "Pay immediately.", "Pay in thirty days.", etc.). The Facilitator then debits or otherwise adjusts the customer's account and credit's or otherwise adjusts the merchant's account to reflect the transaction. Operation in this manner can enable the customer to avoid what may otherwise be a lengthy checkout line.

Figure 2:
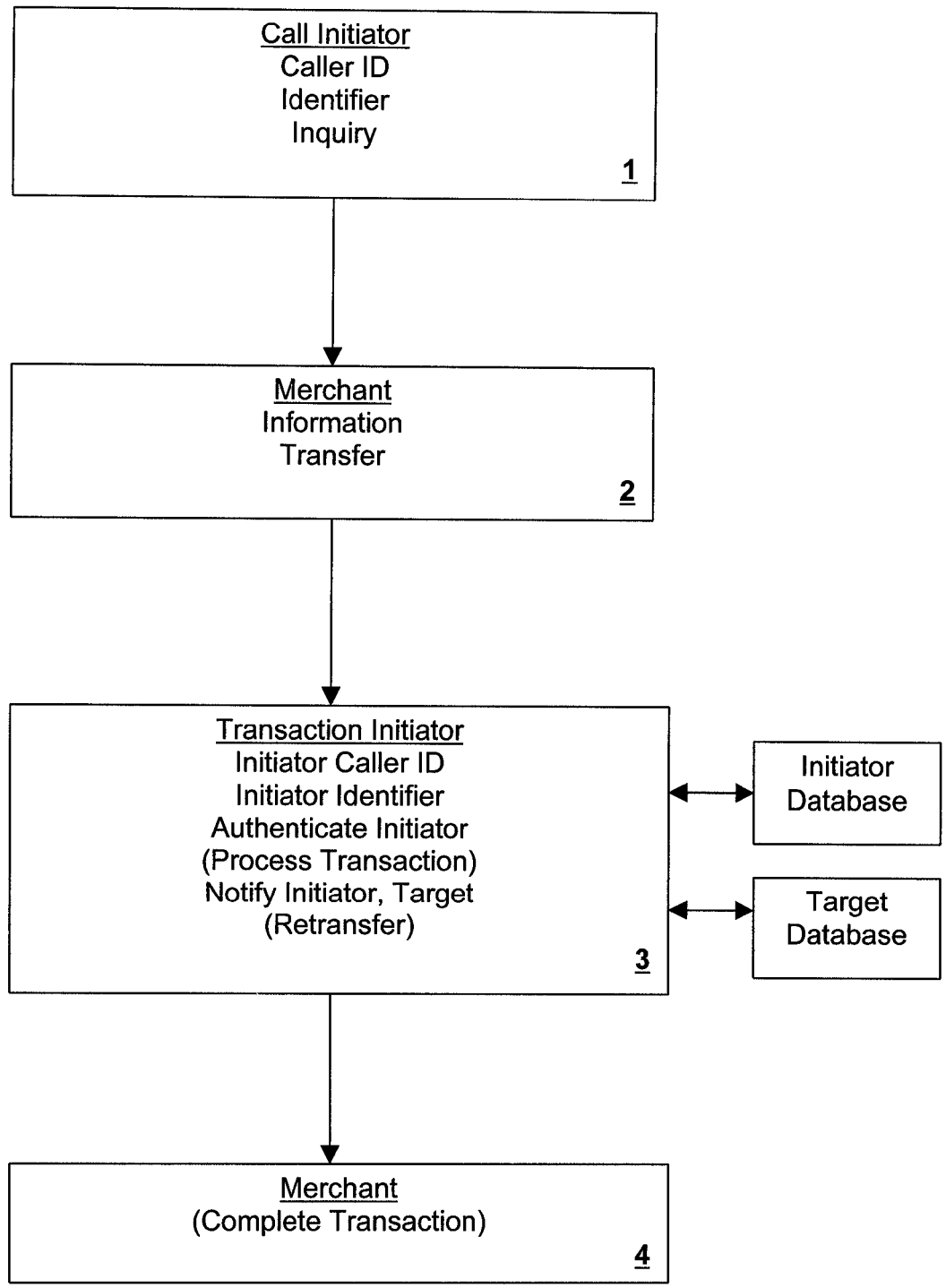
FIG. 2 is a block and line diagram of a second form of authentication and payment system.

FIG. 2 illustrates a second example of the invention, namely, one in which the call initiating a transaction is placed in the first instance not to the Facilitator but to a third party such as a merchant. For ease of understanding, it may be helpful to consider FIG. 2 in connection with a transaction in which a consumer calls a merchant to order a CD that it has just heard advertised, although it will be understood that the invention is not so limited. The transaction begins (step 1) with the Call initiator placing a telephone call to the merchant. The caller may make inquiry of the merchant prior to placing an order, such as to price, configuration, characteristics, warranty and the like, and may provide information to the merchant concerning itself such as name or alias, address, etc. The Caller ID of the initiator is captured in connection with the call, but it need not be used by the merchant; it may simply be transmitted to the Facilitator.

In order to authenticate the initiator, the merchant transfers the call to the Facilitator. The Facilitator authenticates the parties to the proposed transaction (step 2) in the manner previously described in connection with FIG. 1, i.e., it checks the Caller ID and preferably a unique identifier of each party with the respective initiator and target databases; in the present case, the customer is the initiator and the Merchant is the target. If both checks match for each party, the Facilitator notifies the initiator of the transaction (step 3) and inquires as to acceptance. If the initiator accepts, the Facilitator notifies the target of the authentication of the initiator. At this point, the Facilitator may cease to participate further in the transaction, and the transaction may be completed by the Merchant/target. The Facilitator's role in the transaction will thus have been to provide the authentication which gives the Merchant the security needed to proceed with the transaction, knowing that it is not fraudulent. Conversely, the Merchant may desire that the Facilitator complete the transaction. In this case, the Facilitator will complete the transaction in the manner previously described in connection with FIG. 1, e.g., by debiting and crediting the accounts of the Merchant and of the Consumer, respectively, notifying them both of the action, and terminating the call.

Although the above specific examples illustrate the present invention in the context of calls initiated by a customer, it will be understood that the invention is not so limited. For example, the initiator may be a merchant, a utility, or simply a third party who is presenting bills for payment, or a person or entity that seeks transfer of assets from another. In any event, authentication of at least one party to the transaction is accomplished by the Facilitator by means of the party's unique telephone ID (i.e., telephone number, or preassigned static IP address at the Facilitator), preferably in connection with a secondary identifier such as a PIN.

Figure 3:
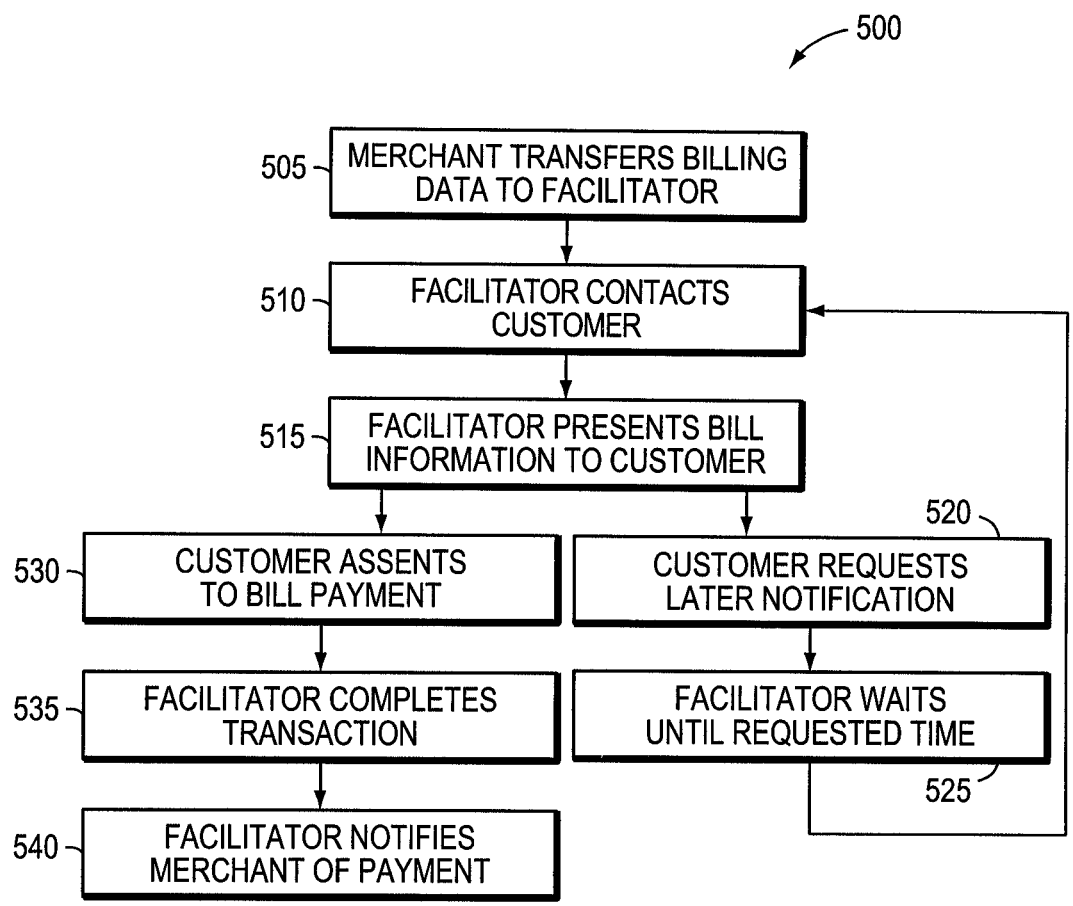
FIG. 3 is a system-wide view of the transfer of assets from a payer trust account to a payee trust account in accordance with the present invention.

A flow chart detailing the procedure 500 that the system performs in accordance with bill presentment and payment is shown in FIG. 3. Initially, in step 505, the merchant contacts the Facilitator and transfers the billing information to the Facilitator. This billing information may include one or more of, for example, the names of the customers, the payments due from each, information relating to the services rendered, the time or times at which the bill is to be presented to the customer, and the telephone number to reach the customer. In step 510, the Facilitator contacts a customer by dialing the customer's phone number through the traditional telephone network. Once contact is made with the customer, then the Facilitator presents the bill information to the customer in step 515. This presentation can include, the name of the requesting entity (i.e. the merchant), amount of the bill, and any other data as desired. The Facilitator also asks that the customer also assent to the bill. If a customer requests that they be notified later (step 520), then the Facilitator waits until the requested time (step 525) before looping back to contact the customer in step 510. For example, a customer may request that he or she be contacted on the date the bill is due or, for example, three days before the bill is due or on the third Sunday of the month at 8 PM.

If the customer assents to the bill payment (step 530), then the Facilitator completes the transaction in step 535. The customer has been verified by the use of the customer's telephone number which the Facilitator itself has dialed. Or alternatively the customer has dialed into the facilitator and the customer's Caller ID has thereby been obtained by the Facilitator. In alternate embodiments, the customer may additionally be verified by a user name, password, voiceprint or other unique identifying information provided by the customer when the call is answered. Once a Facilitator has completed the transaction (step 535), then the Facilitator notifies the merchant of the payment (step 540). This notification can be accomplished using, for example, a database file or other computer files transferred from the Facilitator to the merchant identifying the customer's, the amounts of payment, and other information.

The present invention is readily implemented using existing commercial instrumentalities to provide the necessary hardware; the software is readily assembled from existing communications, database, and financial software modules, with any desired customization well within the skill of those skilled in the art of communications and software. Conventional stored program data processors can perform the necessary processing using such software. It is expected that most transactions will be processed by the Facilitator without the need for human intervention, although the Facilitator may provide such intervention when necessary or desirable.

User Trust Account

As described in detail above, associated with each user of the system of the invention is an account that is associated with at least a telephone number that forms part of the account's principal identity and which may be debited or credited during a transaction. For purposes of reference, such accounts will be referred to hereinafter as "trust accounts", i.e., accounts in which records of debits and credits may be made. Each transaction involving a financial transfer that takes place in the system is reflected in at least one such account. Each account contains certain essential information as to a given user, and may contain further information as desired. In particular, each trust account contains information that uniquely identifies a given user. The user may be identified by the telephone number used to open his/her account, by name, by Social Security Number, by a unique number or other identifier assigned by the Facilitator, or by a combination of these or other information. Additional 'phone numbers may be associated with an account.

A user may have sub-accounts associated with an account. For example, a user may establish separate accounts for household purchases or other transactions, business transactions, etc. A funding mechanism is specified for each trust account. This may be a single mechanism, or it may cover a variety of complementary or alternative mechanisms, such as cash, check, credit card, debit card or other financial mechanisms for transferring money, credits, financial assets, etc. to others or from one account to another.

The currency in which transactions are to be conducted is desirably specified in the trust account. A default currency, such as U.S. Dollars, British Pounds, Euros, etc. may be specified if the user does not specify a different currency. Multiple accounts may also be provided, one for each currency.

Restrictions on transactions may be imposed by the user, the Facilitator, third parties, or one or more of these. For example, where an account or sub-account is funded by credit card, the Facilitator, the card issuer, the user, or one or more of these may impose limits on the amount that may be charged over a given period of time or for a given vendor, or the largest amount that may be charged at any one time, or a combination of these or other restrictions. As will be described in detail below, these or other restrictions may is be associated with, and triggered by, an estimate of the uncertainty in the authentication of a given financial transaction.

A record of the transactions that have been processed in connection with a given account is also maintained in connection with each trust account. This record preferably includes the date of a transaction, the amount, the payer, the payee, the funding mechanism used for the transaction (cash, credit card, etc.), and possibly other data as well. A Trust Account is established not only for each registered user, but also for each target, whether or not the target chooses to register with the Facilitator. Each account is associated with at least a telephone number that forms part of the account's principal identity. From the viewpoint of the Facilitator, a user of the system, whether its role is that of initiator or that of target, may thus be viewed simply as a telephone number, and transactions may be viewed as taking place between two telephone numbers, analogous to person-to-person voice communications but involving transfer of assets as opposed simply to voice communications.

FIG. 4 illustrates some of the data that is preferably recorded in a user's trust account. Some of the data elements have referred to already; others will be described in detail subsequently. Each user has an account, the respective accounts being indicated in FIG. 4 as TA-1, TA-2, TA-3, etc. Each such account, e.g., account TA-1, preferably contains a User Account Number 10, a User Name 12, a User Address 14, Telephone Number 16, Social Security Number 18, and Personal Identification Number 20. Additional identifiers or passwords 20*a* may also be included. One or more Funding Mechanism 22, 24, etc., are identified in the account, as well as an account Transaction History 26 (containing relevant data for account transactions, such as transaction data, payer, payee, amount, nature of transaction, etc.), the Account Balance 28 and the Currency 30 in which the account is maintained. Also contained in, or linked to, the User Account is a voice print 32 of the User as described in more detail below. The voice print comprises a voice prompt obtained from the user, and a statistical analysis of the voice prompt to facilitate subsequent voice comparisons in identifying the speaker who provided the prompt. Additional voice prints 34 may also be stored in or associated with the Account for providing different levels of security or for use in connection with different transactions. The User Account Number can be any number capable of uniquely identifying the account, either by itself or in connection with another identifier, and may, e.g., comprise the user's telephone number, Social Security Number, a sequence number generated by the facilitator, etc.

A user may interrogate an account. For example, the user may wish to retrieve an item of information it may have forgotten, such as its PIN. If the information to be retrieved is part of the information that is to be verified on log in, the Facilitator may allow the user to log in conditionally and with only a limited choice of operations that it can perform until the User establishes full verification. Typically the Facilitator will require a high level of authentication in such cases, e.g., by using one or more of the additional identifiers (passwords) 20 or Voice Prints 32.

Figure 5:
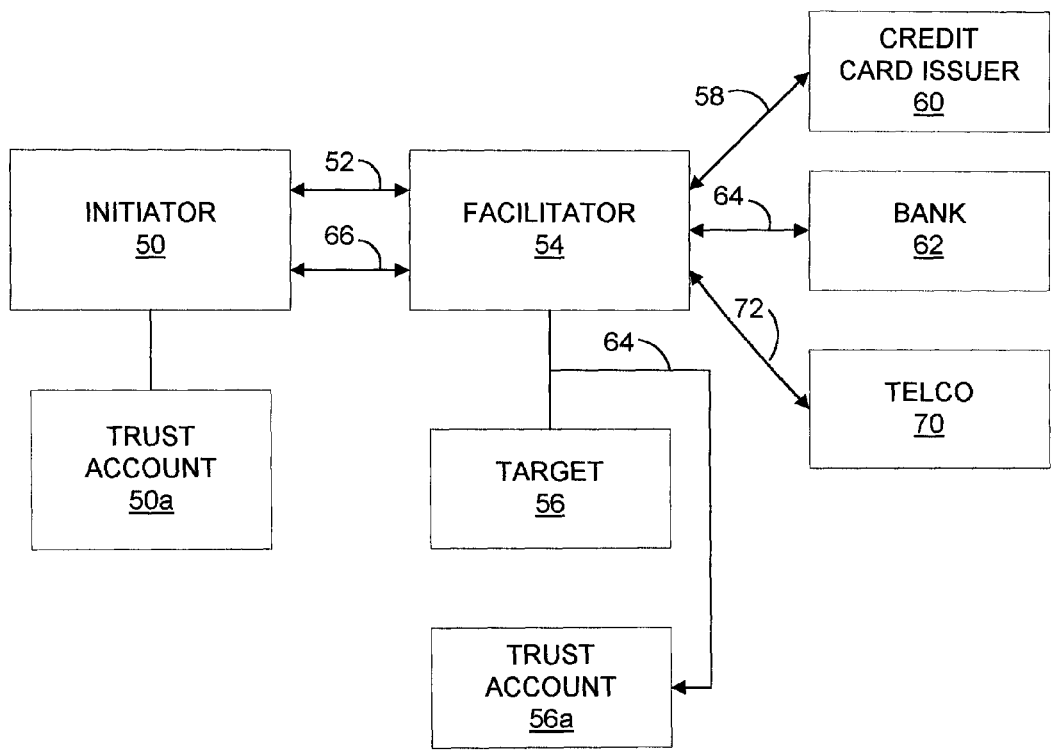
FIG. 5 illustrates the operation of the present invention in the case of a direct transfer of assets from an initiator-payer to a target-payee.

FIG. 5 illustrates the operation of the system in the case of a direct transfer of assets from an initiator-payer to a target-payee. An initiator 50 (which may comprise an individual, a business, or other entity) having a Trust Account 50a contacts (communication step 52) the Facilitator 54 to begin a transaction with a target 56. The initiator defines the transaction to be performed, e.g., pay a specific amount of money to a payee. The initiator may identify the payee by any unique identifier by which the Facilitator may retrieve the payee's telephone number, preferably the payee's telephone number itself, but permissibly by name and address or other unique identifier. The initiator may also specify a Funding Mechanism to used for the transaction, e.g., assets credited in the initiator's trust account, third party sources such as credits cards, debit cards, bank loans, etc.; or may simply rely on a default Funding Mechanism specified in the account.

The Facilitator authenticates the initiator in the manner previously described, i.e., it verifies the telephone number from which the initiator called as a telephone registered to the initiator if the communication from the initiator is by telephone or places a call-back to the telephone number registered to the person or entity that the initiator claims to be in order to verify the communication. The authentication may take place at any time during communication with the initiator, i.e., at the outset, in the course of statement of the desired transaction, at the completion of the communication (including call-back), or a mixture of these.

The Facilitator also examines the Trust Account 50a of the initiator in order to is verify that the account has, or can obtain, sufficient assets to perform the transaction. For example, if the Funding Mechanism to be used for the transaction is to entail a call on funds from a third party in order to support it (e.g., the use of a credit or debit card, a loan from a bank, etc.), the Facilitator may communicate (step 58) with a credit or debit card issuer 60; a bank 62 (step 64); or with any other funding mechanism or source of potential assurance that the appropriate funds are available to the initiator for the particular transaction in question. Alternatively, as opposed to verification of each transaction, where a block of funds can be committed to an initiator's Trust Account in advance of a transaction, the Facilitator need only verify that the funds available within the particular Funding Mechanism designated by the initiator are sufficient to support the transaction.

The Facilitator also authenticates the target. Typically, this is done after the initiator has been authenticated and the availability of the necessary funds has been verified, but may be done at any stage of the transaction. Preferably, the Facilitator first searches its own database (step 64) to determine whether the target is already known to it, i.e., whether it already has a Trust Account 56a associated with it. If the target does have a pre-existing account, funds are transferred into it in accordance with the initiator's request. The Facilitator then preferably notifies the target of this action (step 66), and desirably notifies the initiator as well.

If no preexisting account is found for the target in the subscriber database, a Trust Account 26 will be created for it. This may be a temporary account if the target chooses not wish to register as a subscriber to the system, and will be a permanent account if the target does wish to register. In the latter case, the registration process will generally be the same as that of non-target subscribers, i.e., the target will be asked to provide information that will assist in identifying it and associating it with a specific telephone number. During this process, third party entities such as a Telephone Company (Telco) 72 may be contacted (step 72) to verify information provided by, or concerning, the target account being created. In the course of a transaction between an initiator and a target, records of the transaction are made in both accounts. Assets that are transferred into the target's account may be then released from the account at the direction of the target, subject to any restrictions imposed by the initiator or by the Facilitator.

Enhanced Authentication

While the level of authentication provided by basic Caller-ID Caller ID monitoring (i.e., verifying that the Caller ID transmitted over the voice line (the "voice-line Caller ID") with a call matches a Caller ID associated with a registered user as recorded in a database) may be adequate for transactions of lesser value or infrequent occurrence, it is desirable to provide an enhanced level of authentication for transactions of a given value either because of the risk associated with the transaction or because the frequency of transactions by a user quickly aggregate to a substantial amount. The exact extent of what is "substantial" may be established by the Facilitator or by others (e.g., a credit card issuer), and may vary from time to time, or among subscribers, or in accordance with experience with particular subscribers. In the present embodiment, either or both of two forms of enhancement are specifically provided for.

In a first form of enhanced authentication, basic Caller ID monitoring is enhanced by further matching the voice-line Caller ID Caller ID transmitted with a communication from a user with a Caller ID transmitted separately from the communication, preferably over a different channel, in particular, via the SS7 signaling network that is in common use throughout the United States for telephone communications. This network provides for transmission of Caller ID information over a voice line along with the called number and preceding the desired communication. It also provides the telephone numbers of the call initiator and the called party on a separate control channel ("control-channel ANI" which is the equivalent of Caller ID and so referred to herein). The latter channel is less susceptible to unauthorized monitoring or interception by third parties. In a further embodiment of the present invention, the Facilitator not only checks the voice-line Caller ID against a user database to authenticate the telephone being used to effectuate a financial transaction, but also checks the voice-line Caller ID against the control-channel Caller ID. A match between the two confirms that the instrument being used for the communication (such instrument being referred to here as a "telephone" or "phone", regardless of the form it takes, as long as it is used transmit voice or data over a telephone line) is indeed an instrument associated with a recognized user, and thus increases the is reliability of the verification.

Figure 6:
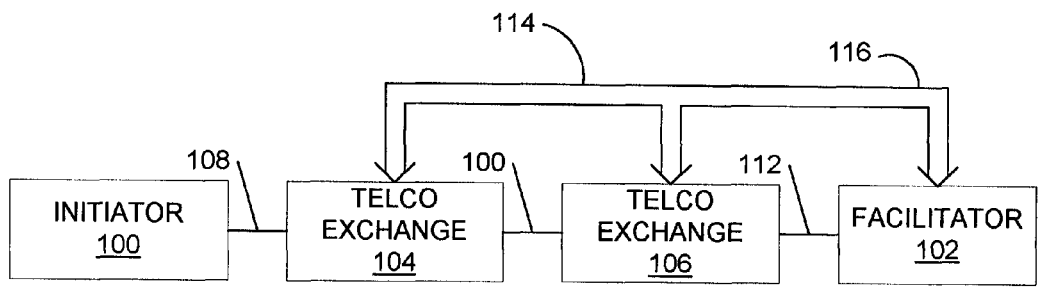
FIG. 6 illustrates an enhanced form of authentication in accordance with the present invention.

Thus, referring to FIG. 6, a communication between an initiator 100 and the Facilitator 102 will typically pass through one or more telephone company exchanges 104, 106 over voice communication lines 108, 110, 112. At the first exchange, 104, the telephone service provider or "Telco" adds certain information to the call that is transmitted with the call on its transportation to the destination. This information includes, inter alia, the Caller-ID Caller ID of the call initiator. At the same time, the Telco also transmits control and other information over a separate control channel, referred to here as the "SS7 control channel", element 114 in FIG. 6 This information is used, among other purposes, to control the set up of the call, its switching through other Telco offices, and the like. It also includes information about the receiver and sender that is the same as the Caller-ID of the sender and receiver.

In accordance with the present invention, the Facilitator, with permission of the Telco, is connected (communication channel 116) to the SS7 control channel 114 to enable the Facilitator to retrieve from that channel the Caller-ID transmitted over that channel in connection with a call that is received over voice-communication line 108. This data, as well as the voice channel data, may be buffered (i.e., temporarily stored) in order to accommodate differences in transmission times. The Facilitator then compares the control channel Caller ID with the voice channel Caller ID to determine whether they match. If they do, the transaction with the initiator 100 is allowed to proceed in the manner described generally above. If they do not match, however, an exception is noted and appropriate action is taken. For example, the Facilitator may request that the initiator place a new call to it to verify that the Telco system has not simply malfunctioned; may request that the initiator call the Facilitator on another telephone that is registered with the Facilitator; may terminate the attempted transaction; or may take other action as appropriate.

In a second form of enhanced authentication, a voice prompt of a subscriber's voice is recorded, preferably at the time of subscriber enrollment but permissibly at other times as well, and from time to time, and is stored in connection with a subscriber's record. The voice prompt may then be accessed in connection with communications with the Facilitator by a user to verify that the person speaking on the phone is indeed the person associated with that phone as stored in the Facilitator database associated with the voiceprint.

The voiceprint is typically obtained from a subscriber at the time of registration, but may be obtained at any time and added to the account information. Although shown as part of the Trust Account itself, it may, of course, be stored in a separate database linked with the subscriber. The voice prompt may comprise any short segment of speech selected by the Facilitator or by the user. It need only be long enough to provide a reasonable level of confidence that a user placing a call to the Facilitator to affect funds in a user account (whether payment into the account or withdrawal form it) is indeed the person the user claims to be. Typically, a few seconds of speech will suffice for this purpose.

Figure 7:
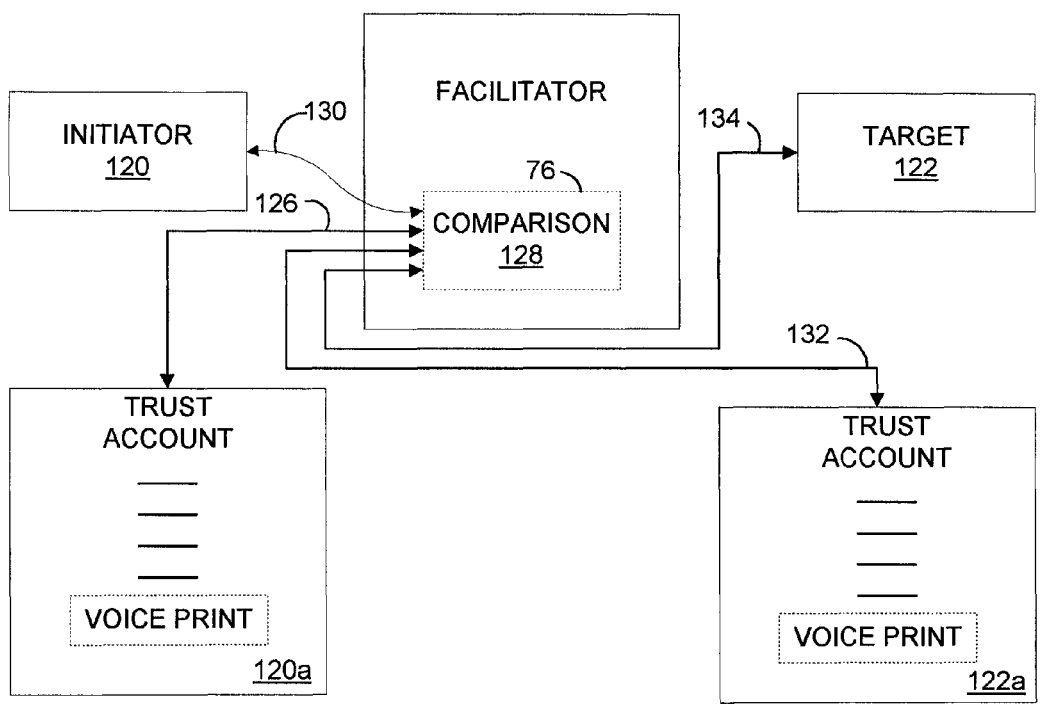
FIG. 7 illustrates a further form of enhanced authentication in accordance with the present invention.

FIG. 7 illustrates a number of modes in which a voice prompt may advantageously be used. In one mode, the Facilitator verifies for itself, through a voice prompt, either the initiator or the target or both. Thus, assume that an initiator 120 wishes to conduct a transaction with a target 122 through the Facilitator 124. In addition to the verification earlier described (or even in place of it), the Facilitator may search for the initiator's Trust Account 120*a* and retrieve (step 126) the initiator's voice print. It then statistically compares (comparison 128) this with the voice of the initiator 120 in the current transaction as transmitted over the voice communication channel (e.g., telephone line) 130. If the comparison succeeds, the transaction is allowed to proceed. Otherwise, it may be aborted, or other action may be taken by the Facilitator. Similarly, if the target 122 is a subscriber, the Facilitator can authenticate, or further authenticate, the target by searching for the target's Trust Account 122*a* and retrieving (step 132) a voice print of the target. The Facilitator then statistically compares (comparison 128) this voice print with the voice of the target 122 in the current transaction as transmitted over a voice communication channel (e.g., telephone line) 134 between the Facilitator and the target. If the comparison succeeds, the transaction is allowed to proceed. Otherwise, it may be aborted, or other action may be taken by the Facilitator.

In another mode, a voice prompt may be used to authenticate one party directly to another. For example, an initiator that is familiar with the voice of an entity with which it is desires to conduct a transaction may desire assurance that the Facilitator contacts the correct target. To provide this assurance, prior to transferring funds or assets to the target, the Facilitator may retrieve a voice prompt of the target that it has identified and thereafter play it back to the initiator. This is preferably done while the initiator is still in contact with the Facilitator on initiating a transaction, but may be done subsequently, e.g., by way of callback from the Facilitator. The initiator, after hearing the voice prompt of the target, may then instruct the Facilitator to proceed with the transaction or, alternatively, may cause its termination without transfer of funds or assets to the target.

Conversely, on being contacted by the Facilitator on behalf of an initiator with whose voice a target is familiar, the target may be provided assurance that it is dealing with an entity known to it by receiving from the Facilitator a play of a voice prompt of the initiator. The voice prompt may be a general voice prompt of the initiator not restricted to the particular transaction or it may be one that has been recorded specifically for this transaction or for this and a specified class of other transactions. The latter (i.e., specially recorded) form not only serves to authenticate the initiator, but also to authenticate the Facilitator as authorized to deal on behalf of the initiator.

A user's voice prompt may also be useful in assuring an initiator that it is dealing with an authentic Facilitator. In particular, when existing subscribers receive a call from the Facilitator, the latter typically requests certain information from them, such as a User ID, PIN, etc., before authorizing a transaction. To prevent an unauthorized party posing as the Facilitator from obtaining this information by trick, the Facilitator preferably plays back to the user at least some portion of the user's pre-recorded voice prompt to thereby verify that the entity to which the user is connecting is indeed the Facilitator. This may be the user's name, or it may be a word or phrase selected and recorded by the user specifically for this purpose. If the user does not hear the correct voice selection in connection with a log-in, it immediately knows that it is connected to an entity other than the Facilitator and can take action appropriately. The user can also request information unique to itself and generally private that it has previously supplied to the Facilitator in order to authenticate the calling entity.

In the case of an unregistered target, of course, no pre-existing voice-print will be available for that user. In that case, the Facilitator may require that the sender and the receiver agree among themselves on a personal code that must be used by the receiver in order to access funds deposited to the receiver's trust account by the sender. Alternatively or additionally, the sender and receiver may conduct the transaction as a bridge call (i.e., a call in which both parties and the Facilitator are on the line), so that the sender and receiver may hear and identify each other's voices. As an alternative to a bridge call, the sender may record his or her voice with a message for subsequent use by the Facilitator in contacting the receiver to thereby provide an enhanced level of security for the transaction.

If no information is found for the designated target, the Facilitator may search for the target in a name-telephone number database of all telephone users, and provide to the Facilitator information from this database. For example, if the initiator provides to the Facilitator the telephone number of the target, and the target is not otherwise listed with the Facilitator, the Facilitator may provide to the initiator the name and address associated with that telephone number in the name-telephone number database, so that the initiator can confirm or reject or modify the transaction.

In some circumstances it will be useful to provide a concurrent three-way bridge among the initiator, the Facilitator, and the target. The bridge may be established by the initiator or by the Facilitator. During the bridge, the initiator can immediately verify the target to the Facilitator (or the target can confirm the initiator to the Facilitator) so that the transaction can proceed. This mode of operation, for example, may be particularly appropriate where the target has not registered with the Facilitator. The target may then register with the Facilitator during the call, or afterwards, or may be provided with a password that will enable it to claim the assets transferred to it by the initiator without formal registration. In any event, a Trust Account is established for the target to receive and hold the assets until at least such time as they are claimed by the target.

The association of voice prints with telephone numbers, particularly voice prints indexed by telephone numbers, is itself a useful and desirable feature. Thus, a registrant whose voice print is on record with the Facilitator, may use this facility to provide further identification when requested. For example, a user desiring to complete a transaction at a bank or merchant who is asked for further identification may call the Facilitator (or arrange to receive a call-back from the Facilitator at a registered phone) and speak a word or phrase which the Facilitator can check against its voice print database to verify the user.

Applications of Enhanced Authentication

Figure 8:
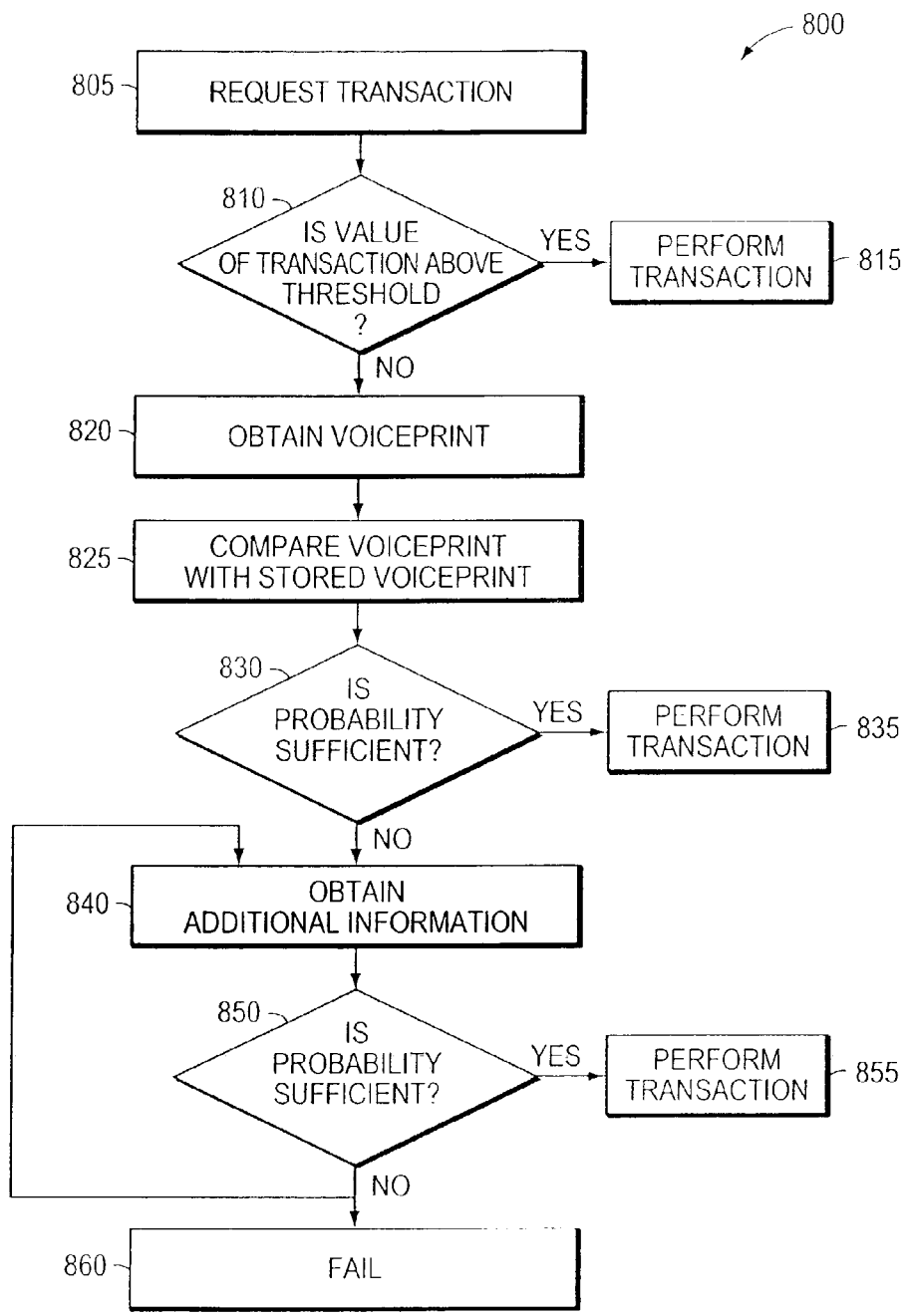
FIG. 8 is a flow chart of a process by which the value at risk in a transaction is controlled in accordance with the present invention.

Active authentication of a communication (such as checking a voice-line Caller ID against a subscriber database; checking a voice-line Caller ID against a control-channel Caller ID; checking a user's voice against a pre-recorded voice-print, etc.) enables the Facilitator to control and limit the risk that it and others dealing with it undertake in connection with transactions to which it is a party. In accordance with a further embodiment of the invention, in connection with at least certain of the transactions, e.g., those for which the subscriber, the Facilitator, or others, may be put at risk of financial loss from a particular transaction, the Facilitator makes use of the enhanced security to put constraints on the transaction in order to minimize, or eliminate, the risk of loss. This embodiment is illustrated in connection with FIG. 8, beginning with a request (step 805) that a transaction be undertaken.

In connection with the transaction, the Facilitator calculates (step 810) the value of the transaction, i.e., the "value at risk" if the risk of loss falls on it, and then takes further action dependent on the results of the calculation. For example, at the outset, the Facilitator may assign a certain maximum or "threshold" value for the acceptable amount at risk for a given subscriber. If the threshold exceeds the value at risk of the transaction, the Facilitator proceeds (step 815) with the transaction. If not, enhanced authentication may be required before the transaction is allowed to proceed. This will be illustrated in FIG. 8 in terms of voiceprint authentication (steps 820, 825) but other forms of enhanced authentication may be used, as will be described below.

The threshold amount may be a certain standard initial amount for all subscribers, or may be a variable amount that is dependent on the particular subscriber or group of subscribers. For example, a subscriber's prior credit history may be used to determine the initial amount, or the initial amount may be determined by the subscriber's credit profile, among other criteria for setting the amount. The amount may be changed from time to time, in accordance with the Facilitator's experience with the subscriber in connection with processing subscriber transactions. Whenever the outstanding debits in the subscriber's account exceed this amount, the Facilitator may take various actions. For example, it may merely provide a warning that the subscriber has exceeded the permissible limits for outstanding debits, and ask the subscriber to rectify this within a certain period of time. It may, instead, block all further transactions in the subscribers trust account until the debit is reduced below the allowable maximum. Other forms of action are, of course, possible.

In one embodiment of the invention, calculation of the value at risk is based at least in part on the level of security that has been determined to be associated with a particular type of communication. This determines, at least in part, the "trust level" to be assigned to said transaction. In particular, each degree of security is characterized by a number from 0 to 1 which may be considered to represent the probability that a given communication is indeed authentic, i.e., is with a verified telephone, or a verified user, or both. A communication that has been authenticated by basic Caller ID monitoring only (i.e., voice-line Caller ID verification against a database) may be assigned a probability of, e.g., 0.90. A communication that has been verified by both basic and control-channel (e.g., SS7) Caller ID monitoring, in contrast, may be assigned a probability of 0.95. A communication that has been verified by call-back may be assigned a probability of 0.99. Other probabilities may be defined on other criteria. The value at risk is then calculated as $A = TV*(1-P)$, where A is the value at risk, TV the transaction value, and P the probability assigned to or calculated for the communication, $0 < P < 1$. Action may then be taken by the Facilitator dependent on whether the value at risk exceeds the permissible threshold for the subscriber associated with the communication.

Furthermore, the Facilitator may establish certain probability requirements for various levels of transactions. For example, for transactions between $5,000 and $10,000, the Facilitator may require an authentication probability of 70%, while for transactions above $10,000 the Facilitator may require a probability of 80% or greater. These probabilities can be customized as the Facilitator desires and for amounts or other classifications. If the probability generated in step 825 is sufficient, then the Facilitator will perform the desired transaction (step 835).

However, if the generated probability is not sufficient to meet the requirements determined by the Facilitator, then the Facilitator will obtain additional details (step 840). These additional details can be obtained by asking the user for certain information, such as a secondary personal identification number (PIN), a mother's maiden name, a portion of the user's social security number, or other personal/private information. The user can enter the information either by, for example, using dual-tone modulated frequency (DTMF) keys on a telephone keypad or by speaking the user's answers. The results of the additional questions are used to modify the probability that the user is in fact the person he or she is claiming to be. After a newly revised probability is generated, then another determination is made (step 850) as to whether the probability is sufficient to enable the transaction to continue. If the probability is now sufficiently high to enable the transaction to continue, then the Facilitator performs the requested transaction (step 855). However, if the newly revised probability is still not sufficient then the Facilitator will fail and not perform the transaction (step 860). However, in alternate embodiments, if the probability is still not sufficient, then the Facilitator may loop back to step 840 to obtain additional details in order to further refine the probability estimate that the user is an authenticated and permissible user.

An important consideration for a Facilitator is the total outstanding liability generated due to spurious or faked transaction requests. For any given transaction the expected value of the transaction is given by the following formula: $E(x)=V \times P_1 \times P_2$, where V is the value of the transaction, $P_1$ is the probability associated with the direction of the telephone call (described further below) and $P_2$ is a probability associated with the voice print. This probability is generated from a voice print taken of the user at the time of the transaction.

A Facilitator can set up a threshold limit for various types of transactions. For example, it may determine that no transaction will be performed if the total probability ($P_1 \times P_2$) is less than a certain amount, e.g., 0.50. Additionally, the Facilitator can assign various probabilities for $P_1$. For example, if a call-back is performed with automatic number identification (ANI), the Facilitator may assign $P_1=1.0$. However, if a call back is performed and no Caller ID Caller ID from the callback number is available, then the facilitator may assign a value of $P_1=0.95$. These probabilities reflect the level of verification achieved by performing a call back with or without Caller ID. Similarly, if a sender calls into the Facilitator's system, then a value of $P_1=0.90$ might be assigned, for example.

The Facilitator may also have a transaction-wide or daily exposure aggregate limit which it adheres to. If a user exceeds the limit, the Facilitator may refuse the transaction or may require further authentication, e.g., through a voice print.

CONCLUSION

From the foregoing, it will be seen that I have provided an authentication and payment system that provides a significant degree of security without the need for special devices. The system uses a unique identifier that is nearly universally available and that itself typically has undergone at least some level of scrutiny by independent third parties (e.g., Telcos) in connection with associating it with a particular device, e.g., a telephone, and with a particular individual or entity. Desired transactions can typically be initiated, authenticated, and authorized during a single phone call by a customer, and may frequently be completed during that call as well. Travel to specific facilities to initiate a transaction is not required, yet a security level higher than that commonly associated with "Authorization When Not Present" transactions is maintained.

Having illustrated my invention and having described preferred embodiments thereof, I claim:

1. A method comprising:
   receiving, at a server from a client device, one or more messages including a resource identifier, a telephone identifier, and an alias assigned by the server;
   transforming, by the server, the telephone identifier and the alias from the message data structure to a database data structure;
   authenticating, by the server, the message from the client device by searching for a stored alias and a stored transaction identifier associated with the alias in a database that matches the alias and telephone identifier in the message; and
   in response to authenticating the message, authorizing, by the server, a transfer of a resource.

2. The method of claim 1, wherein the client device is selected from the group consisting of a POS device, wireless device, landline telephone, web browser and computer.

3. The method of claim 2, wherein the resource identifier is supplied by a group selected from a broadcast advertisement, print advertisement, or targeted advertisement.

4. The method of claim 1, wherein the message is further authenticated from a group selected from a password and Personal Identification Number (PIN).

5. A method comprising;
   storing, by a server, an alias associated with a target account, wherein the alias identifies the target as one registered with the server, without compromising a private secondary identifier used by the target to authenticate itself to the server;
   receiving, at the server from a client device, the alias, a telephone identifier, and a resource in one or more messages;
   transforming, by the server, the received target alias from the message data structure to a database data structure;
   authenticating, by the server, the one or more messages from the client device by searching for a stored alias and a stored transaction identifier associated with the alias in a database that matches the alias and telephone identifier in the one or more messages; and
   providing instructions to the server to credit the target account by the resource amount.

* * * * *

UNITED STATES PATENT AND TRADEMARK OFFICE
CERTIFICATE OF CORRECTION

PATENT NO. : 9,767,455 B1  
APPLICATION NO. : 13/689308  
DATED : September 19, 2017  
INVENTOR(S) : Mohsenzadeh et al.

Page 1 of 1

It is certified that error appears in the above-identified patent and that said Letters Patent is hereby corrected as shown below:

On the Title Page

Item (12) "Mohsenzadeh" should read -- Mohsenzadeh, et al. --.

Item (72) Inventor is corrected to read:
-- Hossein Mohsenzadeh, Medford, MA (US);
Bill Spencer, Weston, MA (US) --.

Signed and Sealed this
Seventeenth Day of September, 2019

Andrei Iancu
*Director of the United States Patent and Trademark Office*